(12) United States Patent
Wang et al.

(10) Patent No.: US 7,848,560 B2
(45) Date of Patent: Dec. 7, 2010

(54) CONTROL OF MULTIPLE FREQUENCY BANDS FOR DIGITAL IMAGE

(75) Inventors: Xiaohui Wang, Pittsford, NY (US); Mary E. Couwenhoven, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 694 days.

(21) Appl. No.: 11/834,356

(22) Filed: Aug. 6, 2007

(65) Prior Publication Data

US 2008/0002906 A1 Jan. 3, 2008

Related U.S. Application Data

(63) Continuation-in-part of application No. 10/625,964, filed on Jul. 24, 2003, now Pat. No. 7,266,229.

(51) Int. Cl.
*G06K 9/40* (2006.01)
*G06K 9/00* (2006.01)

(52) U.S. Cl. .................................... 382/132; 382/260

(58) Field of Classification Search ................ 382/132, 382/260
See application file for complete search history.

(56) References Cited

U.S. PATENT DOCUMENTS

| 5,467,404 | A | | 11/1995 | Vuylsteke |
| 5,644,662 | A | | 7/1997 | Vuylsteke |
| 5,805,721 | A | | 9/1998 | Vuylsteke et al. |
| 5,978,518 | A | * | 11/1999 | Oliyide et al. ............... 382/260 |
| 6,069,979 | A | | 5/2000 | VanMetter |
| 6,072,913 | A | | 6/2000 | Yamada |
| 6,167,165 | A | | 12/2000 | Gallagher et al. |
| 6,424,730 | B1 | | 7/2002 | Wang et al. |
| 6,480,300 | B1 | | 11/2002 | Aoyama |
| 6,868,189 | B1 | * | 3/2005 | Hoshino ..................... 382/260 |
| 7,079,700 | B2 | | 7/2006 | Shinbata |
| 2001/0017619 | A1 | | 8/2001 | Takeuchi |
| 2003/0112374 | A1 | | 6/2003 | Wang et al. |
| 2003/0179945 | A1 | * | 9/2003 | Akahori ..................... 382/260 |

OTHER PUBLICATIONS

Richard Van Metter et al., Enhanced latitude for digital projection radiography, SPIE, SanDiego, CA, Feb. 1999, vol. 3658, pp. 468-483.
R.F. Bessler et al., Contrast Enhancement Using Burt Pyramid Processing, SID 86 Digest, 1986, pp. 352-353, 19.3.
A. Polesel et al., Adaptive Unsharp Masking for Contrast Enhancement, 1997 IEEE, pp. 267-270.
Martin Stahl et al., Digital radiography enhancement by nonlinear multiscale processing, Med. Phys. 27 (1), Jan. 2000, pp. 56-65.

(Continued)

*Primary Examiner*—John B Strege

(57) ABSTRACT

A method of enhancing a digital image obtains the digital image, then decomposes the provided digital image according to a plurality of a number N frequency bands, including a low frequency band and more than one different higher frequency bands. Modified image data is formed by applying a gain function to image data for one or more of the N frequency bands according to a setting of a number M control points, wherein M is less than N. The modified image data for the N frequency bands are summed to form a reconstructed digital image.

16 Claims, 19 Drawing Sheets

OTHER PUBLICATIONS

Mary Couwenhoven et al., Enhancement method that provides direct and independent control of fundamental attributes of image quality for radiographic imagery, Medical Imaging 2004-SPIE vol. 5367, pp. 474-481.

Steffen Hoppner, Ingo Maack, Ulrich Neitzel, Martin Stahl, Philips Medical Systems, "Equalized Contrast Display Processing for Digital Radiography", Medical Imaging 2002, Visualization, Image-Guided Procedures, and Display, SPIE, vol. 4681, pp. 617-625.

* cited by examiner

CONTROL OF MULTIPLE FREQUENCY BANDS FOR DIGITAL IMAGE

CROSS REFERENCE TO RELATED APPLICATIONS

This is a continuation-in-part of U.S. patent application Ser. No. 10/625,964 filed on Jul. 24, 2003 now U.S. Pat. No. 7,226,229 entitled "METHOD FOR RENDERING DIGITAL RADIOGRAPHIC IMAGES FOR DISPLAY BASED ON INDEPENDENT CONTROL OF FUNDAMENTAL IMAGE QUALITY PARAMETERS" in the names of Couwenhoven et al., which is commonly assigned.

FIELD OF THE INVENTION

This invention relates in general to image enhancement in digital image processing and in particular, to a method of image enhancement for diagnostic images, such as those available from a computed radiography system or other medical radiographic imaging system.

BACKGROUND OF THE INVENTION

To provide a suitable diagnostic image, it is often necessary to enhance images acquired from the imaging apparatus in order to improve image quality. Fundamental attributes that govern the image quality of a grayscale image include brightness, dynamic range, contrast of detail (or detail contrast), sharpness of edges, and the appearance of noise in the image. It is beneficial to provide a system that enables direct and independent control of these attributes of image quality. Further, a system that enables the control of the detail contrast, sharpness, and noise appearance in a density-dependent fashion is also beneficial.

There have been a number of proposed solutions that address the problem of diagnostic image enhancement. For example, U.S. Pat. No. 5,805,721, entitled "Method and Apparatus for Contrast Enhancement", inventors P. Vuylsteke and E. Schoeters, issued Sep. 8, 1998 describes a multi-resolution method for enhancing contrast with increased sharpness that includes dynamic range compression and enhancing contrast without noticeably boosting the noise component. The described process enhances detail contrast and sharpness via a multi-resolution method and controls dynamic range compression with a gradation curve to map the processed image into the appropriate dynamic range for the display. Application of the gradation curve will impact both the apparent detail contrast and dynamic range of the displayed image. Hence, both the modifying functions of the multi-resolution processing and the shape of the gradation curve affect the detail contrast in the image. This complex relationship requires that both be adjusted when setting the detail contrast in the image.

U.S. Pat. No. 5,978,518, entitled "Image Enhancement in Digital Image Processing", inventors Oliyide et al., issued Nov. 2, 1999 and U.S. Pat. No. 6,069,979 (continuation-in-part of U.S. Pat. No. 5,978,518), entitled "Method for Compressing the Dynamic Range of Digital Projection Radiographic Images", inventor VanMetter, issued May 30, 2000, describe a multi-resolution method for performing dynamic range modification and high-frequency enhancement (including detail contrast). The methods include a tone scale look-up-table that is used to map the image for display rendering. A tone scale look-up-table impacts the dynamic range and contrast of detail in an image. Hence, in this method, the dynamic range and detail contrast of the image depends on both the settings of the frequency modification and the parameters of the tone scale look-up table. It is desirable, instead, to have a less complex arrangement in which a single set of parameters control these attributes independently of each other.

U.S. Pat. No. 6,072,913, entitled "Image Processing Method and Apparatus", inventor M. Yamada, issued Jun. 6, 2000, describes a multi-resolution method for enhancing frequencies with dynamic range compression. The described invention requires the definition of many functions to control the performance of the algorithm. It does not disclose a set of parameters that directly and independently control all of the fundamental attributes of image quality.

Addressing difficulties not successfully handled by previous image enhancement solutions, commonly assigned U.S. Patent Application Publication No. 2005/0018894 entitled "Method For Rendering Digital Radiographic Images For Display Based On Independent Control Of Fundamental Image Quality Parameters" to Couwenhoven et al. discloses a method for digital image enhancement that enables image characteristics to be adjusted in a substantially orthogonal manner. The Couwenhoven et al. '8894 disclosure teaches modification of image characteristics by decomposing the image according to a number of frequency bands, then independently adjusting gain and related characteristics for each band.

The method described in the Couwenhoven et al. '8894 disclosure allows a degree of independence for manipulation of particular image characteristics without severe impact on other attributes. Thus, for example, the dynamic range can be adjusted with minimal effect on image contrast. It can be appreciated that it would be useful to have capable user interface tools and techniques that work with the frequency bands provided when using the Couwenhoven et al. '8894 technique and related methods that decompose image content according to frequency range.

SUMMARY OF THE INVENTION

It is an object of the present invention to address the needs described in the background section and advance the art of digital image enhancement, especially image enhancement of medical diagnostic (radiographic) digital images.

According to a feature of the present invention, there is provided a method of enhancing a digital image comprising: a) obtaining the digital image; b) decomposing the provided digital image according to a plurality of a number N frequency bands, including a low frequency band and more than one different higher frequency bands; c) forming modified image data by applying a gain function to image data for one or more of the N frequency bands according to a setting of a number M control points, wherein M is less than N; and d) summing the modified image data for the N frequency bands to form a reconstructed digital image.

ADVANTAGEOUS EFFECT OF THE INVENTION

Advantages of the present invention include the capability to variably adjust multiple frequency bands for image content with relatively few operator controls. Adjustment of image attributes using the methods of the present invention also allows a measure of orthogonality or independence of adjustment for a number of image characteristics.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
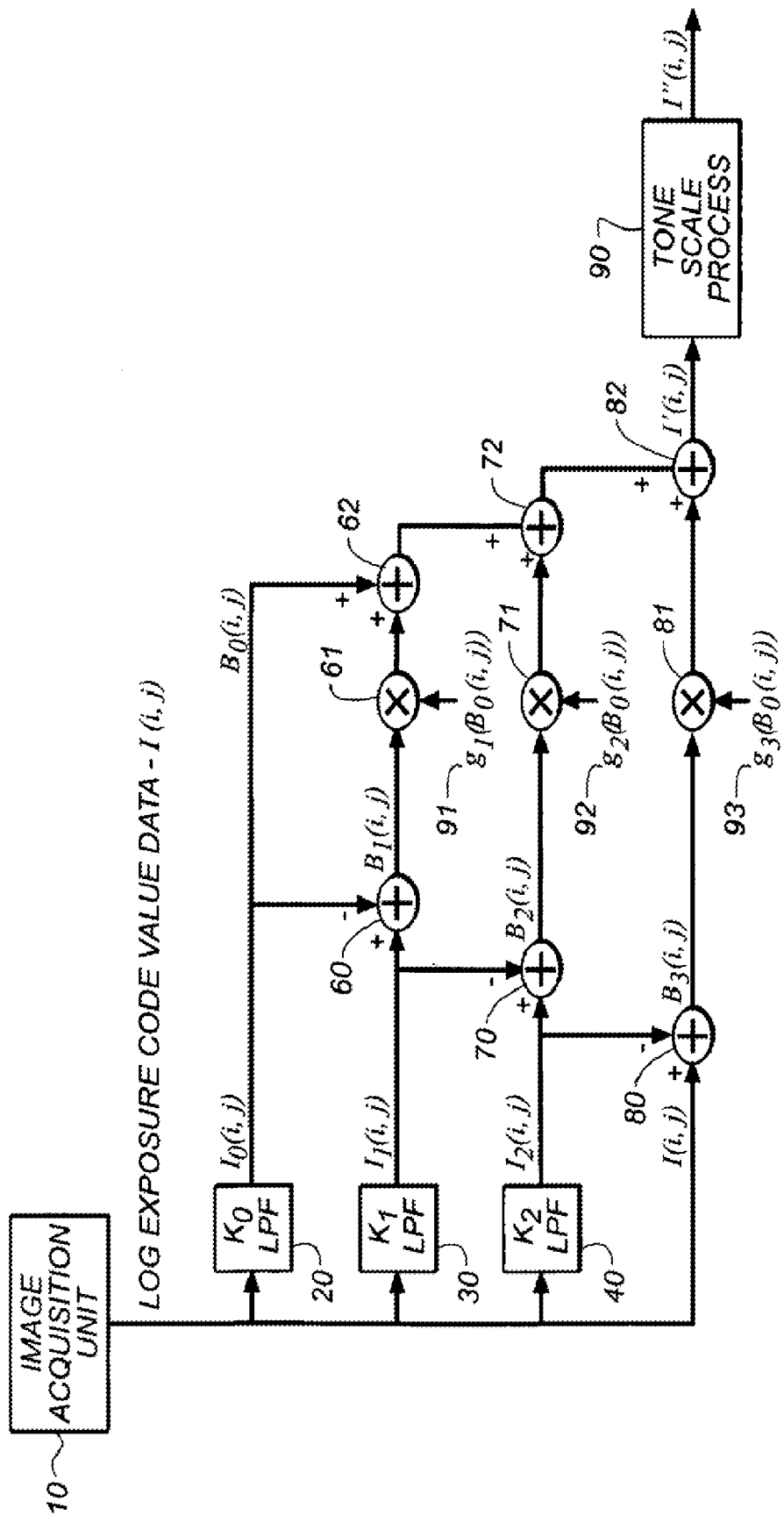
FIG. 1 is a flow diagram of image processing in an embodiment of the present invention.

Referring now to FIG. 1, there is shown a block diagram that shows how embodiments of the present invention process an obtained digital image in order to allow manipulation of individual frequency bands. A digital image in which code value is linearly related to log exposure is captured with an image acquisition unit 10. Unit 10 can be for example, a medical image acquisition unit such as, a diagnostic image unit (MRI, CT, PET, US, etc.), a computed radiography or direct digital radiography unit, an x-ray film digitizer, or the like. Any other digital image acquisition unit can also be used). The present invention processes the log exposure code value data, as shown in FIG. 1; accordingly, the digital image data is split into four frequency bands $B_0(i, j)$, $B_1(i, j)$, $B_2(i, j)$ and $B_3(i, j)$. The log exposure code value data $I(i, j)$ of the input digital input digital image is first processed by three different low-pass filter (LPF) operators 20, 30, and 40. Each operator uses a square-wave filter. It will be evident to those skilled in the art that other low-pass filter shapes such as a triangle-filter can be used. The filter kernel sizes are chosen to manipulate different sized features (or different frequency ranges) in the image.

The first low-pass filter operator 20 uses kernel $K_0$. This operator uses the largest kernel size and it passes only the lowest frequencies. It generates the low-pass image $I_0(i, j)$. The next low-pass operator 30 uses kernel $K_1$. This operator uses the next largest kernel size and it passes the low to mid frequencies. It generates the low-pass image $I_1(i, j)$. The final low-pass operator 40 in this example uses kernel $K_2$. This operator uses the smallest kernel size and it passes all frequencies except for the very highest. It generates the low-pass image $I_2(i, j)$.

The low-pass images are used to generate the frequency bands. The lowest frequency band image is $B_0(i, j)$ and is equal to $I_0(i, j)$. This band represents large-sized features in the image (and contains the lowest frequencies). Manipulation of this band produces a change in dynamic range or latitude. The next frequency band $B_1(i, j)=I(i, j)-I_0(i, j)$ is generated by a subtractor 60. This band contains the low-to-mid frequencies and represents mid-sized features in the image. Manipulation of this band produces a contrast effect without noticeably affecting the overall dynamic range. The next frequency band $B_2(i, j)=I_2(i, j)-I_1(i, j)$ is generated by a subtractor 70. This band contains the mid-to-high frequencies and represents the small-sized features in the image. Manipulation of this band produces a sharpness or blurring effect of the small-sized features. The next frequency band $B_3(i, j)=I(i, j)-I_2(i, j)$ is generated by a subtractor 80. This band contains the highest frequencies in the image and represents very fine detail in the image. Manipulation of this band produces a sharpness or blurring effect of very fine detail in the image.

As shown in FIG. 1, the higher frequency bands $B_1(i, j)$, $B_2(i, j)$, and $B_3(i, j)$ are multiplied by respective gain terms 91, 92, 93 by respective multipliers 61, 71, 81 and summed 62, 72, 82 together with the lowest frequency band image $B_0(i, j)$ to generate the reconstructed image using I'. The reconstructed image I' is defined as $$I'(i, j)=B_0(i, j)+g_1(B_0(i, j))*B_1(i, j)+g_2(B_0(i,-j))*B_2(i, j)+g_3(B_0(i, j))*B_3(i, j)$$

If the bands are not manipulated, that is if $g_1(B_0(i, j))=g_2(B_0(i, j))=g_3(B_0(i, j))=1.0$, the reconstructed image I' is equal to the original image I, i.e., $I'(i, j)=I(i, j)$.

As shown in FIG. 1 the reconstructed image I' is mapped through a tone scale (TS) process 90 which maps the values into the desired display range. The output image is represented as $I''(i, j)=TS(I'(i, j))$.

Figure 2:
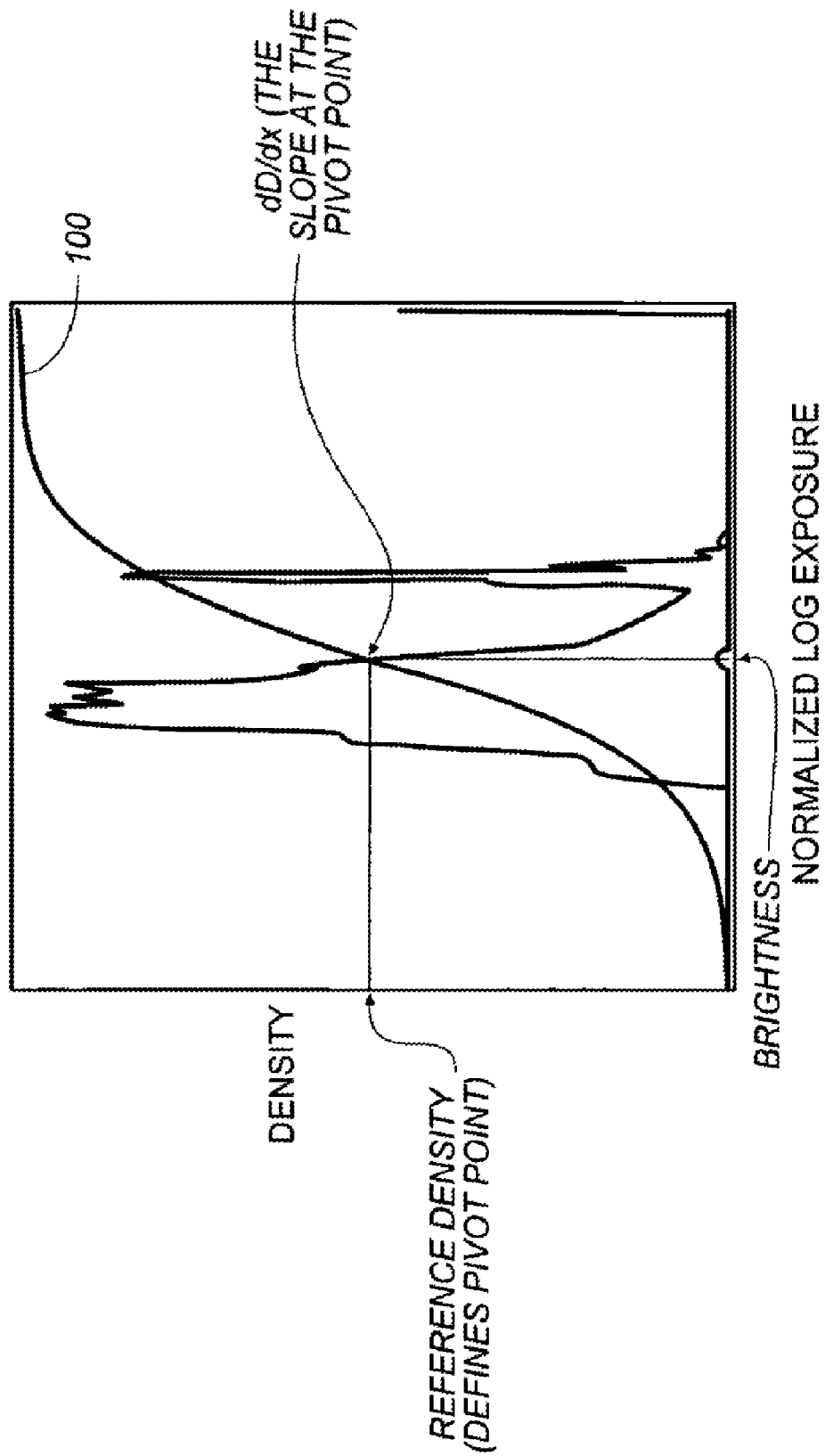
FIG. 2 is a graphical view showing an example of tone scale function and parameters useful in explaining embodiments of the present invention.

FIG. 2 shows an example of a tone scale function 100 used to map log exposure (x-axis) to optical density (y-axis). It is a sigmoid shape and is parameterized by the minimum density and maximum density, the reference density (or pivot point), the brightness (or shift of tone scale along the log exposure axis relative to the pivot point), and the slope, $$\frac{dD}{dx}$$

about the reference density. The reference density maps the log exposure value that will remain invariant when the slope of the tone scale is varied. The brightness control is used to shift the mean density of the image. The brightness control defines the log exposure code value that is mapped via the tone scale to the reference density.

Figure 3:
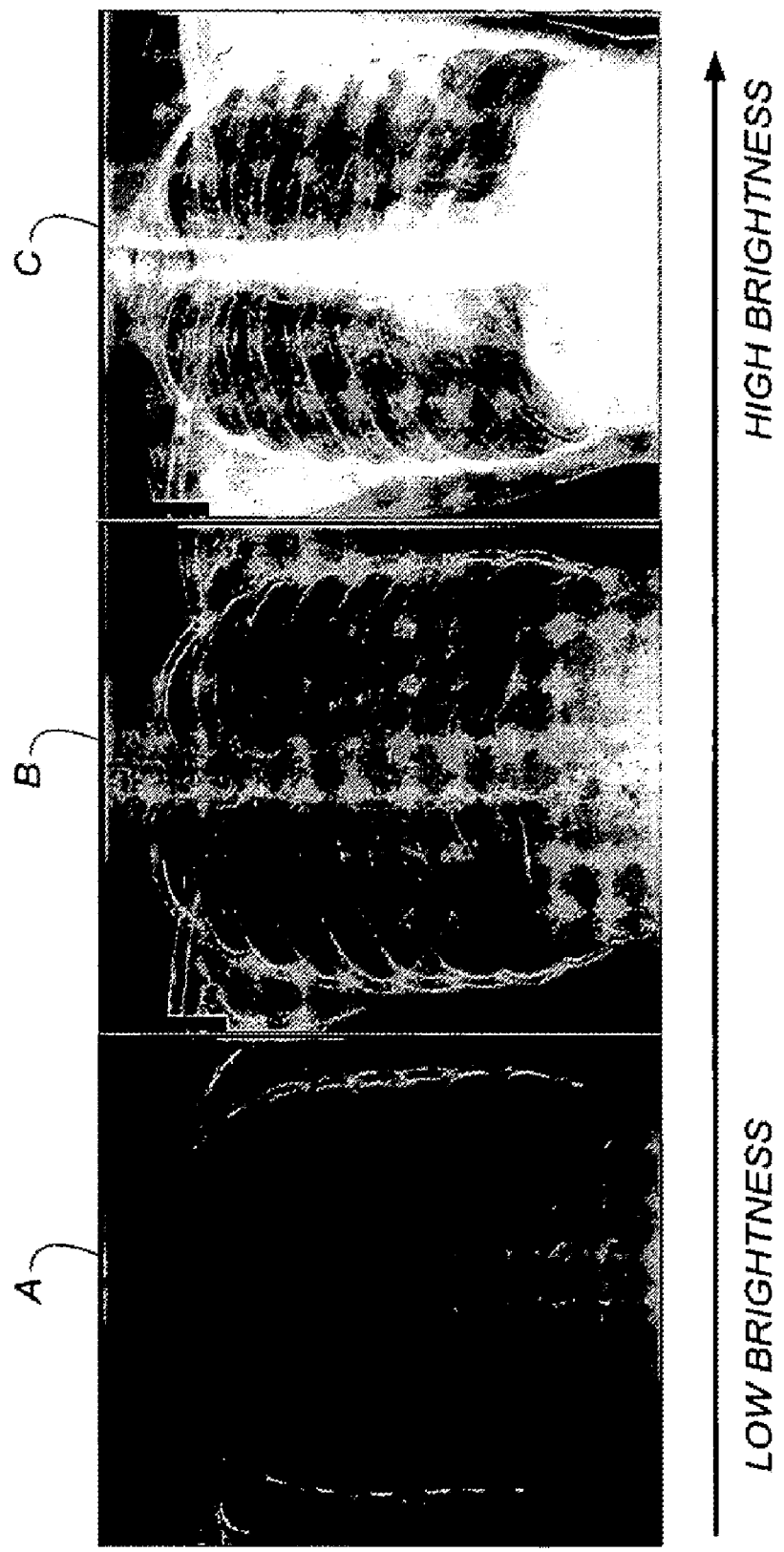
FIG. 3 is a diagrammatic view illustrating brightness control used in embodiments of the present invention.

FIG. 3 shows the effect of the brightness control (Image A to Image C). Increasing the brightness control lowers the mean density of the image (Image C is lower in mean density than Image A) (or increases the brightness of the image), while decreasing the brightness control raises the mean density of the image (or darkens the image). In a preferred embodiment, the tone scale function is further mapped to a standard gray scale display function (as specified by the Medical Image Standard format DICOM PART 10) for monochrome image presentation. This facilitates the same gray scale rendering between softcopy (video monitor) systems and between softcopy and hardcopy (film, paper) systems.

Figure 4:
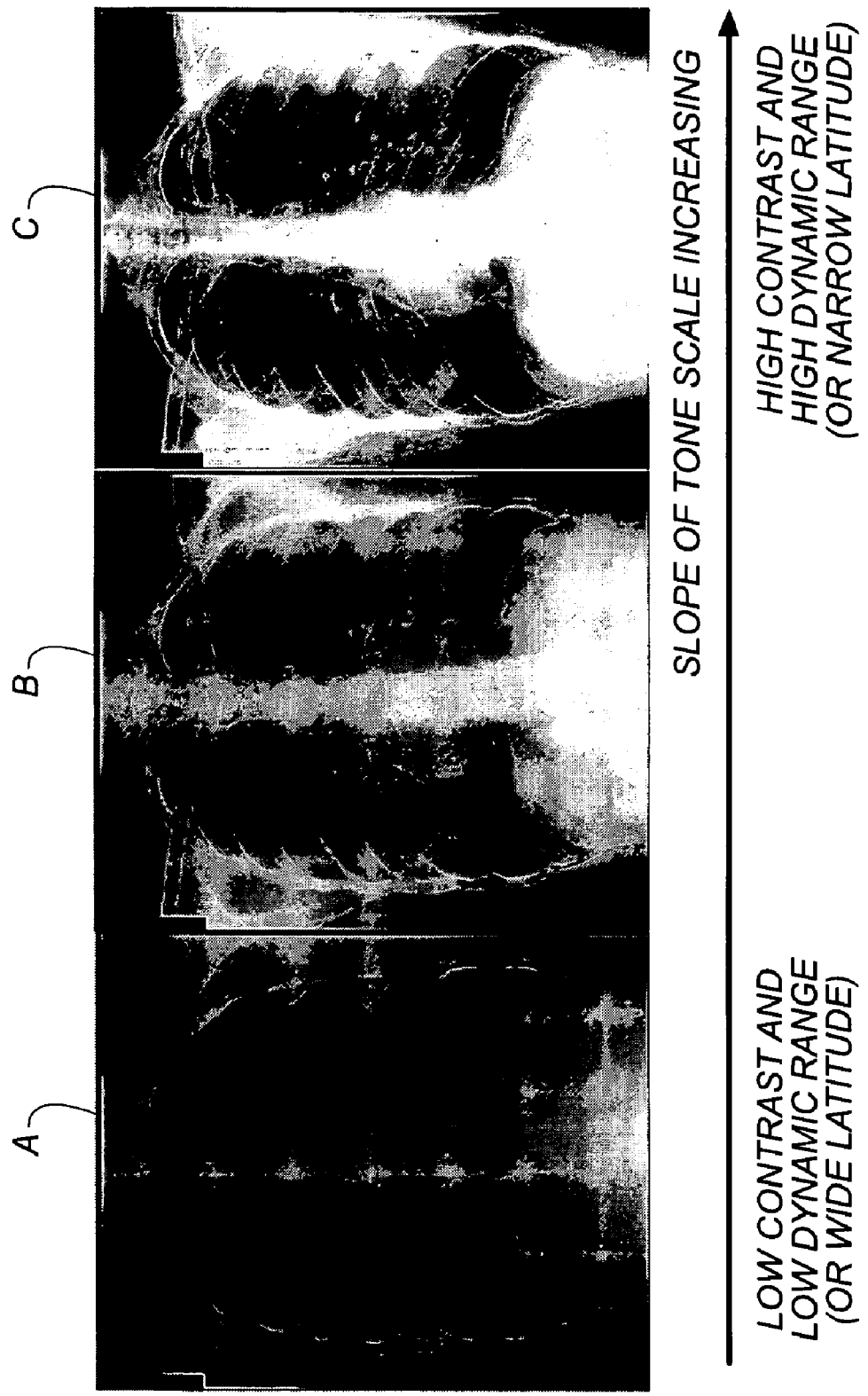
FIG. 4 is a diagrammatic view illustrating the effect of increasing the slope of the tone scale useful in explaining embodiments of the present invention.

The amount of contrast in which the mid size detail in an image is rendered is defined as the detail contrast. In traditional screen film radiographic imaging systems, there is an inherent tradeoff between detail contrast and latitude (or range of log exposure that are rendered to unique densities). In these systems, if the contrast is increased, the latitude is decreased (or image dynamic range is increased). Likewise, if the latitude is increased, (or image dynamic range decreased) the detail contrast is decreased. The same is true if the image dynamic range and detail-contrast are controlled via a digital enhancement process (e.g., multi-resolution decomposition) in which the output of the process is mapped through a tone scale to render it to the display. Inherently, the tone scale also modifies both the dynamic range and detail contrast of an image. As shown in FIG. 4, from image A to image C as the slope of the tone scale increases both the image dynamic range and detail-contrast are increased and the latitude is decreased. Unless the digital enhancement process accounts for the tone scale effects, both the dynamic range and detail-contrast of the image will be affected upon display.

In the embodiment of the present invention, shown in FIG. 1, the lowest frequency band of the multi-resolution decomposition is $B_0(i, j)$. If this band is manipulated, it affects the dynamic range of the image. As previously discussed, the slope of the tone scale $$\frac{dD}{dx}$$

also affects the dynamic range.

According to the present invention, the lowest band is not manipulated for dynamic range control; instead, the slope of the tone scale is used. The dynamic range control is defined as the slope of the tone scale, dynamicRange=dD/dx at the reference density. Increasing the dynamic range reduces the latitude while decreasing the dynamic range increases the latitude.

Manipulation of frequency band $B_1(i, j)$ portion affects the detail contrast of the image. According to the present invention, band $B_1(i, j)$ is multiplied by the gain function gi $(B_0(i, j))$ at multiplier 61. As previously discussed, the slope of the tone scale also affects the detail contrast of the image. To account for the fact that both the slope of the tone scale $$\frac{dD}{dx}$$

and the gain function gi $(B_0(i, j))$ affect the detail contrast, a detail contrast control is defined as a detailContrast($B_0(i, j)$)=$g_1(B_0(i, j))$*(dD/dx).

Figure 5:
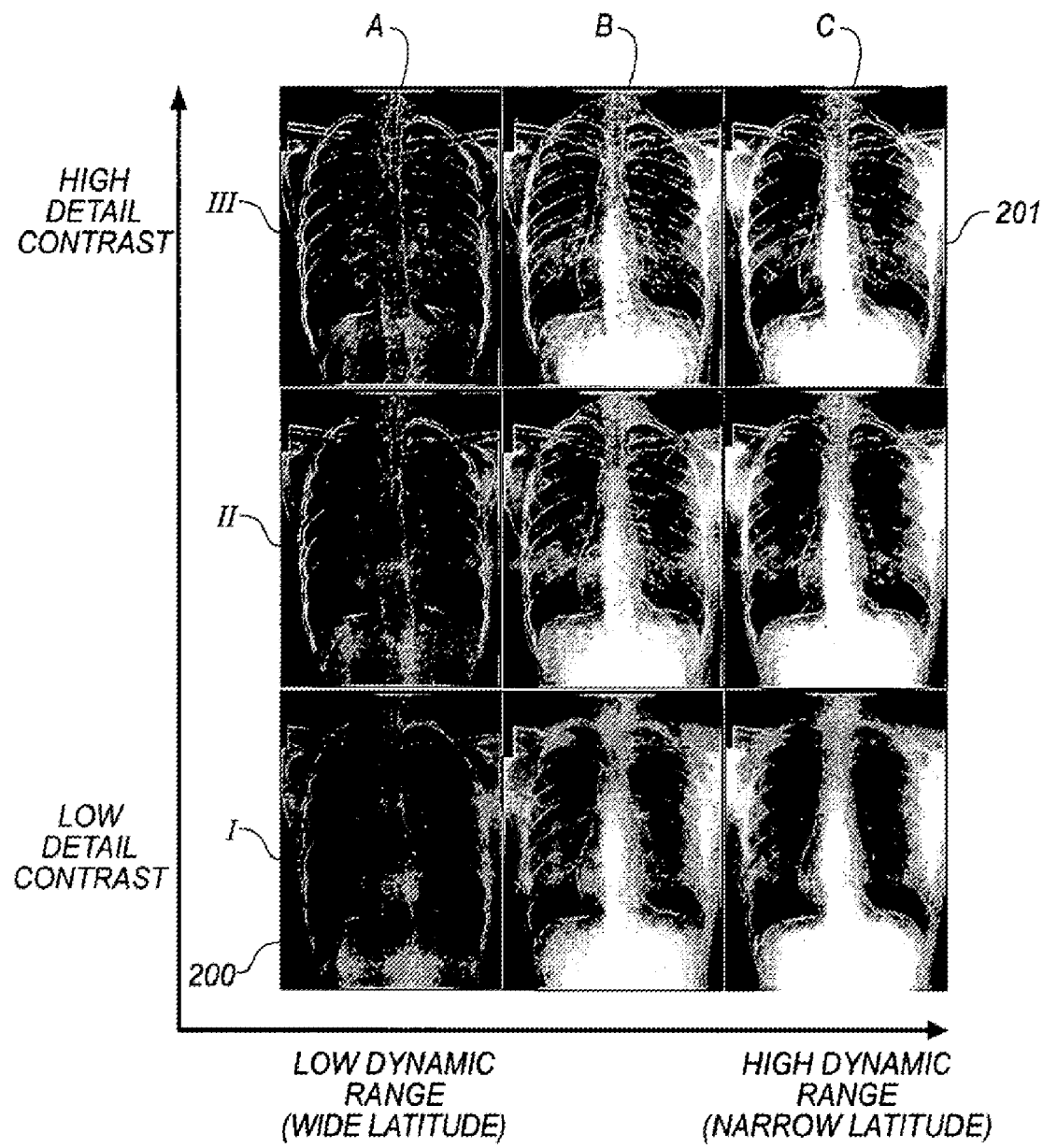
FIG. 5 is a diagrammatic view illustrating the independent control of detail contrast vs. dynamic range provided using the present invention.

By defining the dynamic range and detail contrast parameters in this way independent control of these attributes can be achieved. This is illustrated by FIG. 5. This shows a 3×3 matrix of images (i.e., IA, IB, IC, IIA, IIB, IIC, IIIA, IIIB, IIIC) processed using these controls. By moving from left to right (Image A and Image C) across a row (I, II, III) in the matrix, the dynamic range increases as the value of the dynamic range control is increased, while the detail contrast is held constant at a particular level. By moving from the bottom to top of the matrix along a column (A, B, C) the detail contrast increases as the value of the detail contrast control is increased while the dynamic range is held constant at a particular level. The image 200 (IA) in the bottom left corner has wide latitude and low detail contrast, while the image 201 (IIIC) in the upper right corner has narrow latitude and high detail contrast.

The controls for the sharpness of small features, sharpness ($B_0(i, j)$), and very fine features, fineDetail($B_0(i, j)$), are defined as follows $$\text{sharpness }(B_0(i, j)) = \frac{g_2(B_0(i, j))}{g_1(B_0(i, j))}$$

$$\text{fineDetail}(B_0(i, j)) = \frac{g_3(B_0(i, j))}{g_2(B_0(i, j))}$$

To achieve independent control of sharpness/blurring, it is found that controlling the gain ratio between the frequency bands is important. The sharpness($B_0(i, j)$) parameter provides control of the sharpness of small detail in an image, and the fineDetail($B_0(i, j)$) parameter provides an extra level of control over the sharpness of very fine detail in an image.

The gain functions that are used to manipulated the frequency bands, $B_1$, $B_2$, and $B_3$ can be derived from detail contrast, sharpness and fine detail controls respectively as follows:

$$g1(B0(i, j)) = \frac{detailContrast(B_0(i, j)}{\frac{dD}{dx}}$$

$$g_2(B_0(i, j)) = \text{sharpness }(B_0(i, j)) * g_1(B_0(i, j))$$

$$g_3(B_0(i, j)) = \text{fineDetail}(B_0(i, j)) * g_2(B_0(i, j))$$

The present invention enables exposure dependent control of the detailContrast($B_0(i, j)$), sharpness($B_0(i, j)$), and fineDetail($B_0(i,j)$) values. The low band image $B_0(i, j)$ represents the average log exposure and serves as a map of exposure regions in an image. To achieve exposure dependent control of the image enhancement, the parameters are defined as a function of that band. Areas of the low band image where the code values are low correspond to the low exposure regions in the image (that is the low density or bright areas in the image). Areas where the code values are high correspond to high exposure regions in the image (that is the high density or dark areas in the image). This information can be used to provide exposure dependent control of detail contrast, sharpness of edges, and sharpness of fine detail and to improve the enhancement of the image.

Figure 6A:
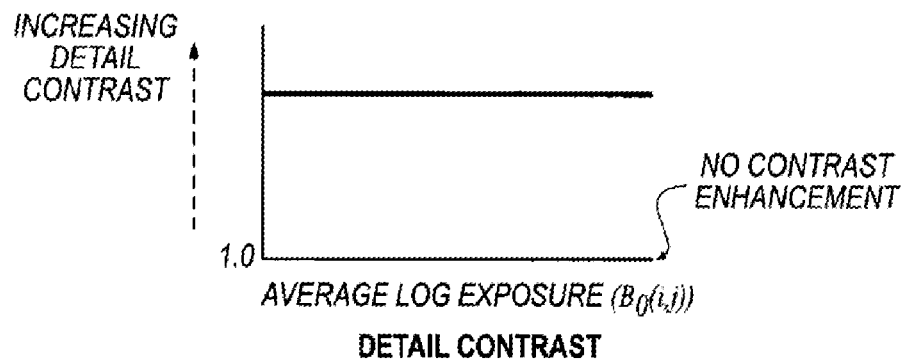
FIGS. 6a-6c are graphical views of functions to control detail, contrast, sharpness, and fine detail, respectively.
Figure 6B:
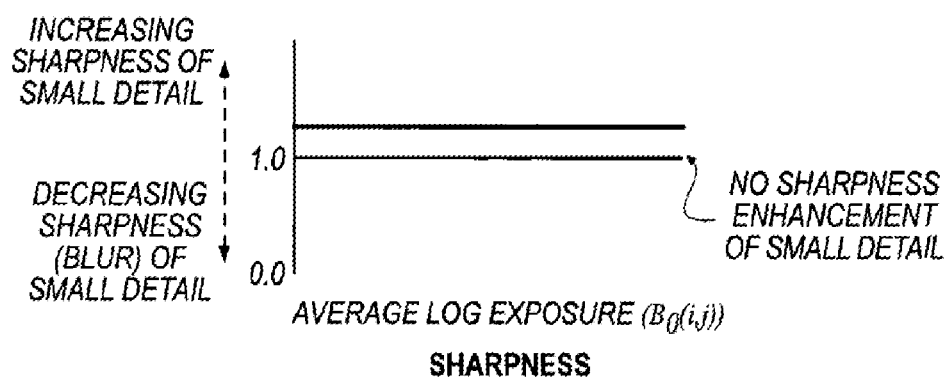
Figure 6C:
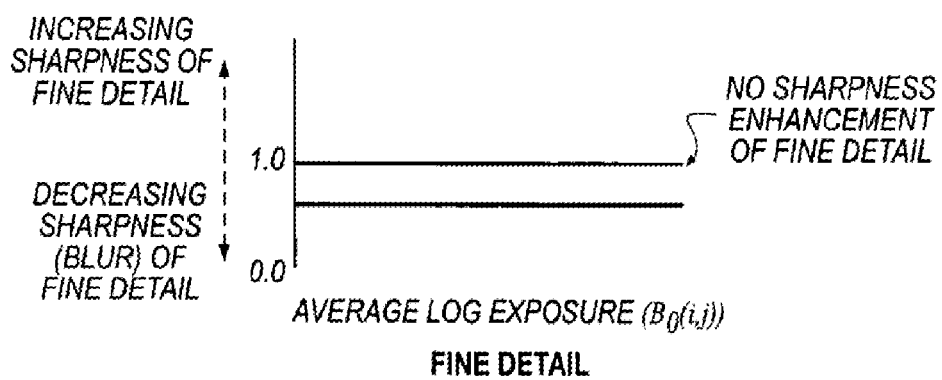

FIGS. 6a-6c show examples of a functional form of the detail contrast (FIG. 6a), sharpness (FIG. 6b), and fine detail (FIG. 6c) controls, respectively. In this example the function is constant across all exposure regions (exposure independent). When a control is set to a value of 1.0 there is no enhancement of features in the image. While a control value greater than 1.0 result in the enhancement of features in the image. Both the sharpness and the fine detail controls can have values less than 1.0 (but not negative). If these controls are set to a value less than 1.0, the corresponding features are blurred (the gain of these bands are decreased relative to the lower bands). Setting the fineDetail($B_0(i,j)$) control to a value less than 1.0 is used to reduce the appearance of high frequency noise in an image.

Figure 7A:
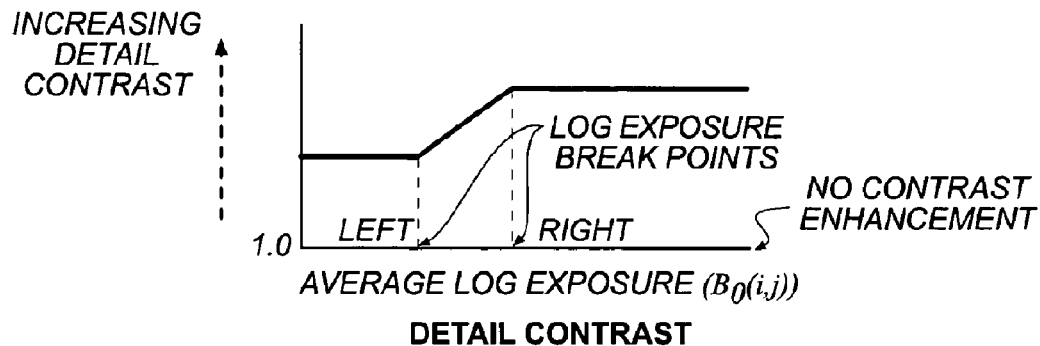
FIGS. 7a-7c are graphical views of log exposure dependent functions to control detail contrast, sharpness, and fine detail, respectively, according to embodiments of the present invention.
Figure 7B:
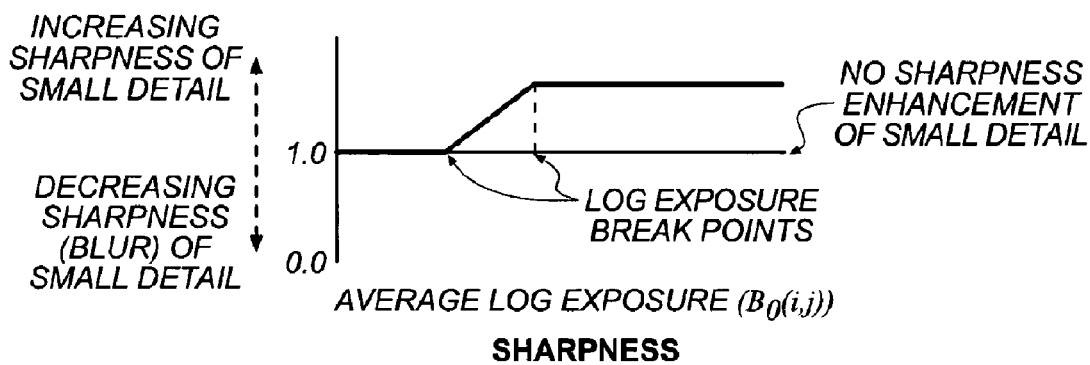
Figure 7C:
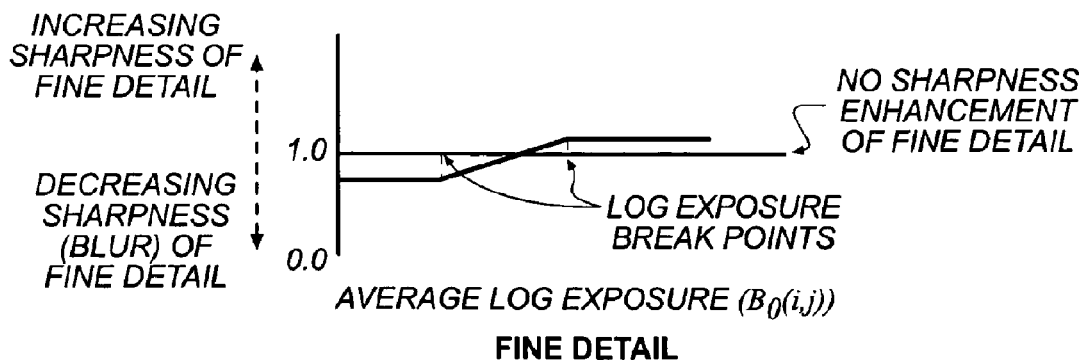

FIGS. 7a-7c shows an example of an exposure dependent functional form that can be used for detail contrast, sharpness and fine detail controls, respectively. The functional form is a piecewise linear curve in which two breakpoints are used. The function is parameterized by setting a left and right log exposure break point, and a left function value (for $B_0(i,j)$<=left breakpoint) and a right function value (for $B_0(i,j)$>=right break point). The functional form between the breakpoints is linear.

Figure 8:
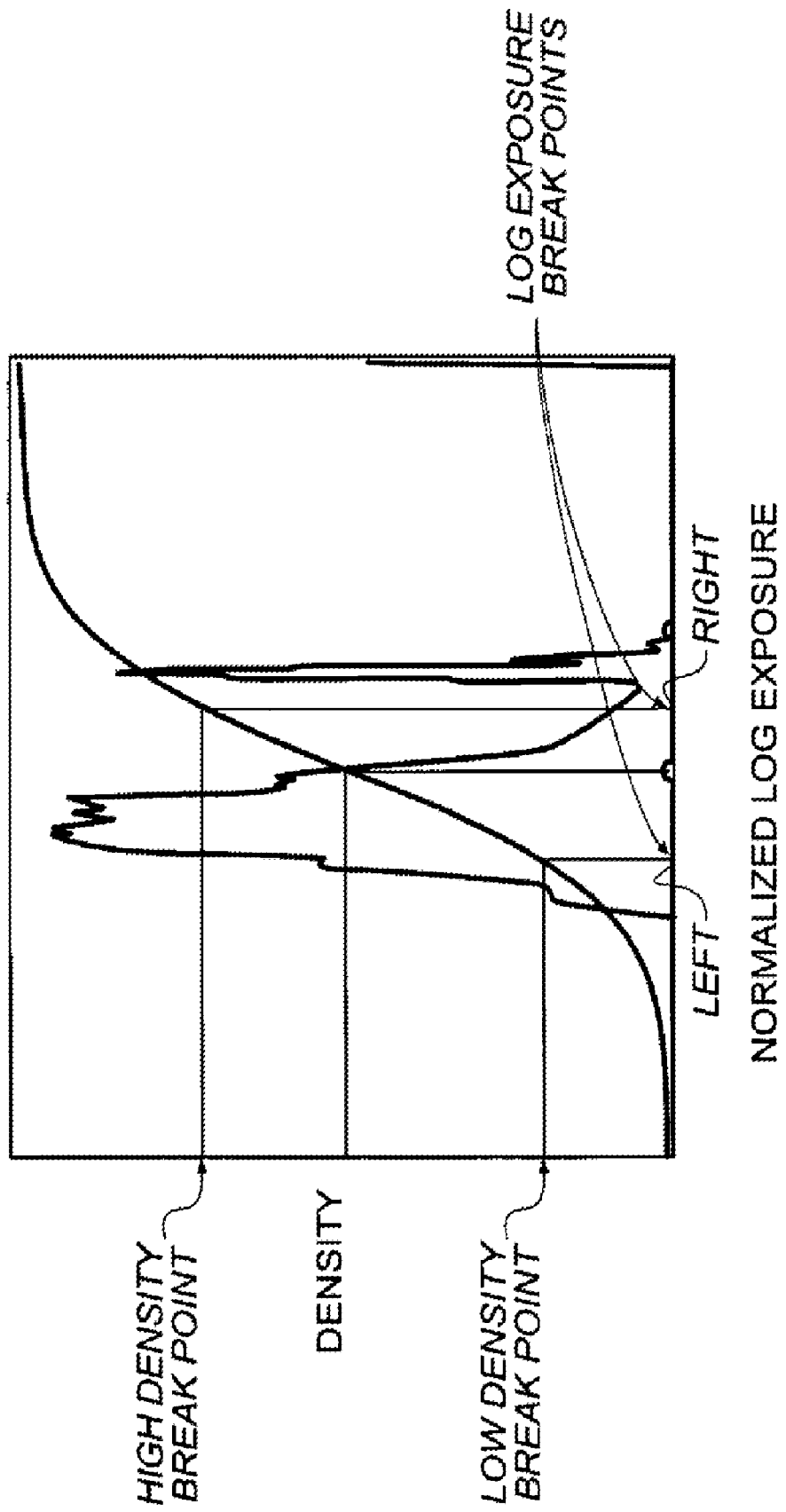
FIG. 8 is a graphical view showing the mapping of density breakpoints to log exposure break points according to embodiments of the present invention.
Figure 9:
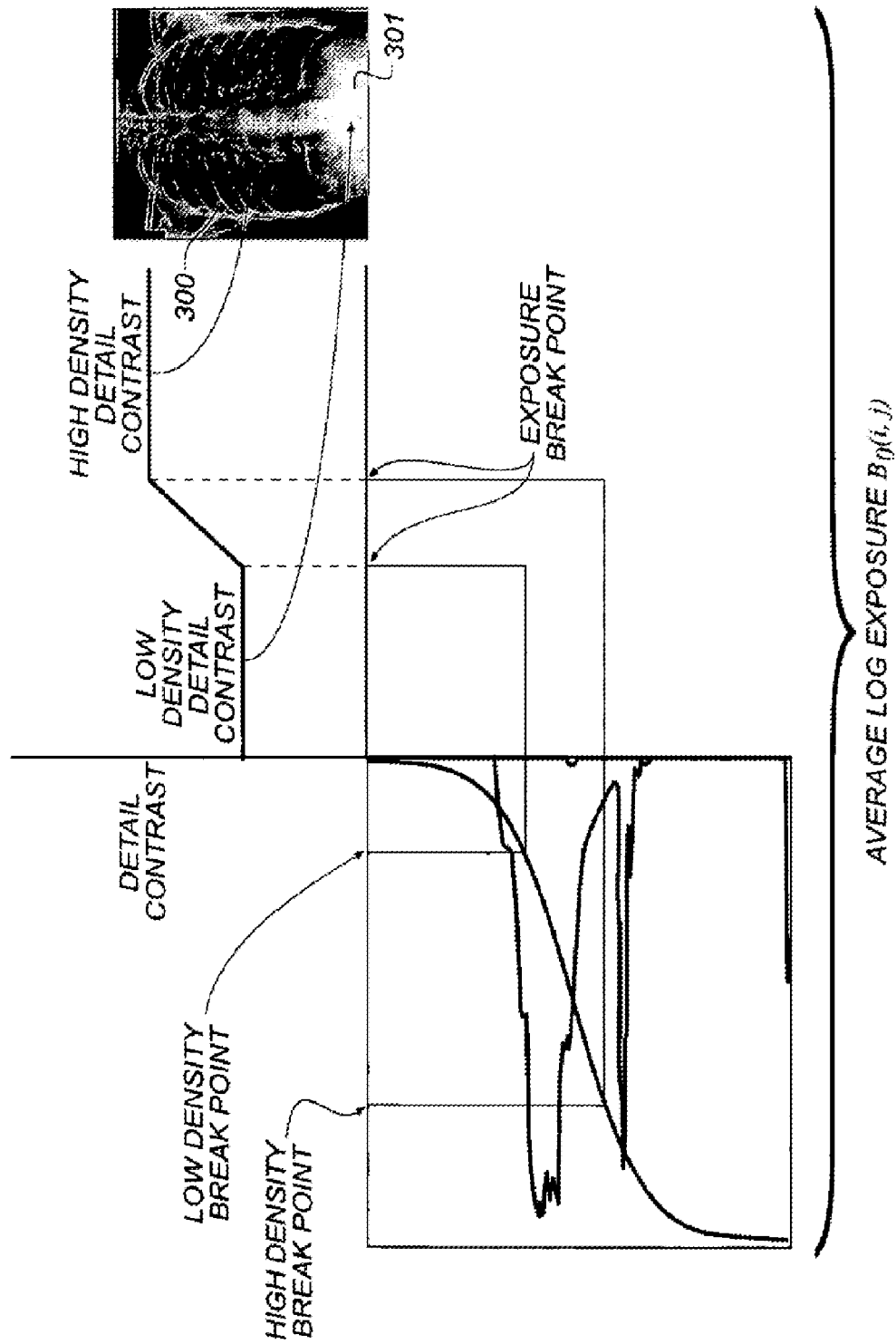
FIG. 9 is a diagrammatic view of density dependent control of the detail contrast according to embodiments of the present invention.

As shown in FIG. 8, breakpoints can be first assigned in density and then mapped to log exposure breakpoints via the tone scale curve. The high-density breakpoint is mapped to the right log exposure breakpoint and the low-density breakpoint is mapped to the left log exposure breakpoint. Once the brightness and dynamic range of the image are set, via the tone scale, then the log exposure breakpoint are defined. Setting the breakpoint in density provides a mechanism to achieve a preferred rendering of density regions. Often they correspond directly to important anatomical structures in a radiographic image of an individual. For example, on a chest image, the lung field is a higher density (darker) region and can be rendered differently from the diaphragm, which is in a lower density (brighter) region. As illustrated in FIG. 9, a user or image analysis algorithm can independently control the detail contrast (as well as sharpness of small and fine detail (or noise suppression)) in low and high-density areas of an image. For example the detail contrast can be set higher in the lung field areas 300 and lower in the lower density diaphragm area 301.

It will be noted by those skilled in the art that there are other useful functional forms that can be generated for the detailContrast($B_0(i,j)$), sharpness($B_0(i,j)$), and fineDetail($B_0(i,j)$) controls.

Figure 10:
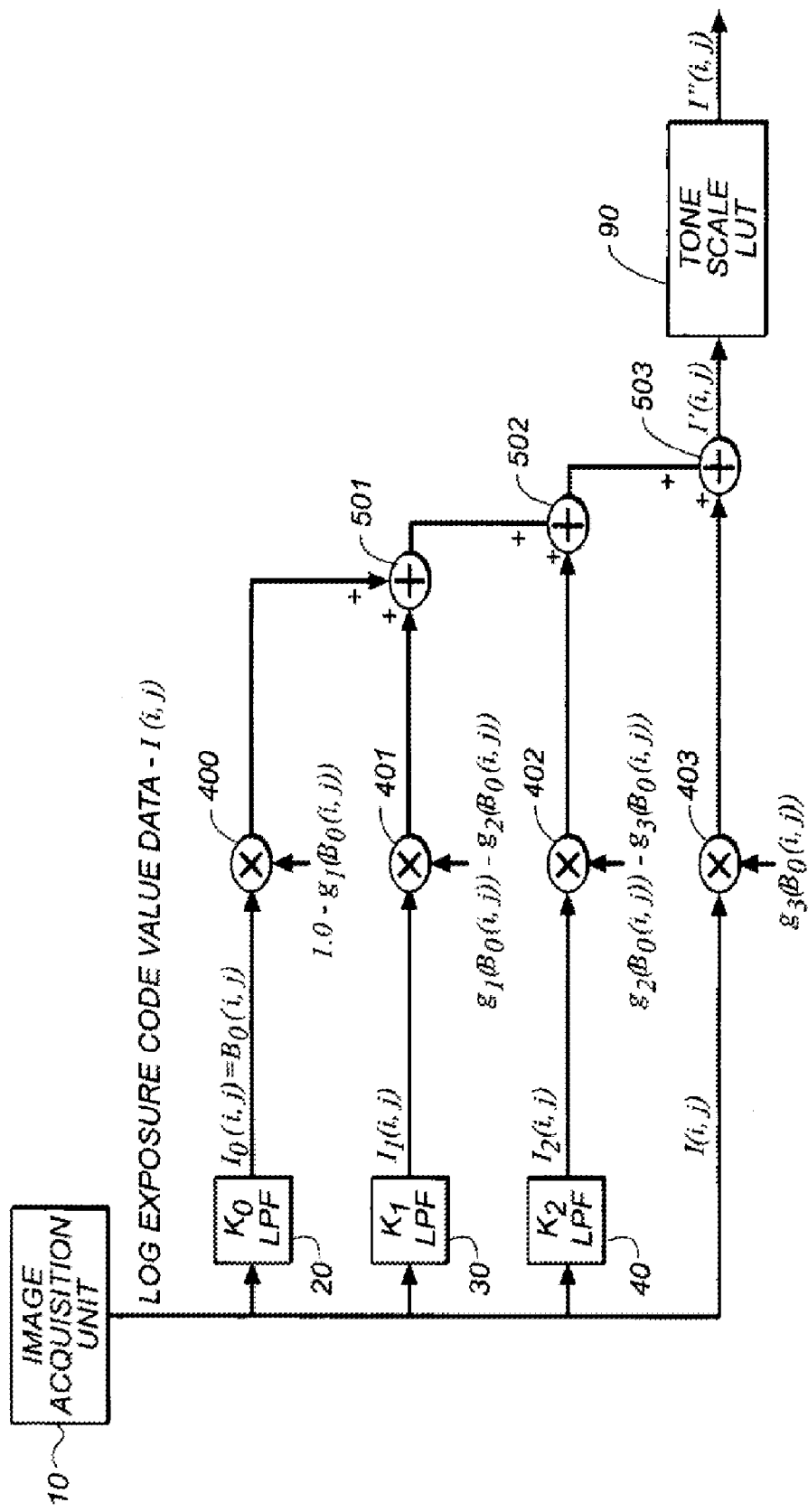
FIG. 10 is a flow diagram of another embodiment of the present invention.

Another image processing embodiment of the present invention is shown in FIG. 10. In this embodiment, the original image I(i, j) from Image acquisition unit 10 and the low-pass images (and not the frequency band images) from low pass filter operators 20, 30, 40 are directly manipulated at multipliers 400, 401, 402, and 403, and the results are summed together or otherwise combined at adders 501, 502, and 503 to generate the reconstructed image I'(i, j) which can be expressed as:

$$I'(i,j)=g_3(I_0(i,j))I(i,j)+(I-g_1(I_0(i,j)+-(g_1(I_0(i,j)-g_2(I_0(i,j)))I_1(i,j)+(g_2(I_0-(i,j)-g_3(I_0(i,j)))I_2(i,j)$$

This embodiment produces the same result as the method shown in FIG. 1 but does not require the calculation of the frequency band images and may be advantageous in some implementations.

The brightness and dynamic range parameters and the parameters for the detailContrast($B_0(i, j)$), sharpness($B_0(i, j)$), and fineDetail($B_0(i,j)$) functions be either entered directly at a user interface to the algorithm or automatically determined via an image analysis method.

It is possible to extend the frequency de-composition process described with reference to FIGS. 1 and 10 to include one or more additional frequency bands for an even closer control of image properties.

Figure 12:
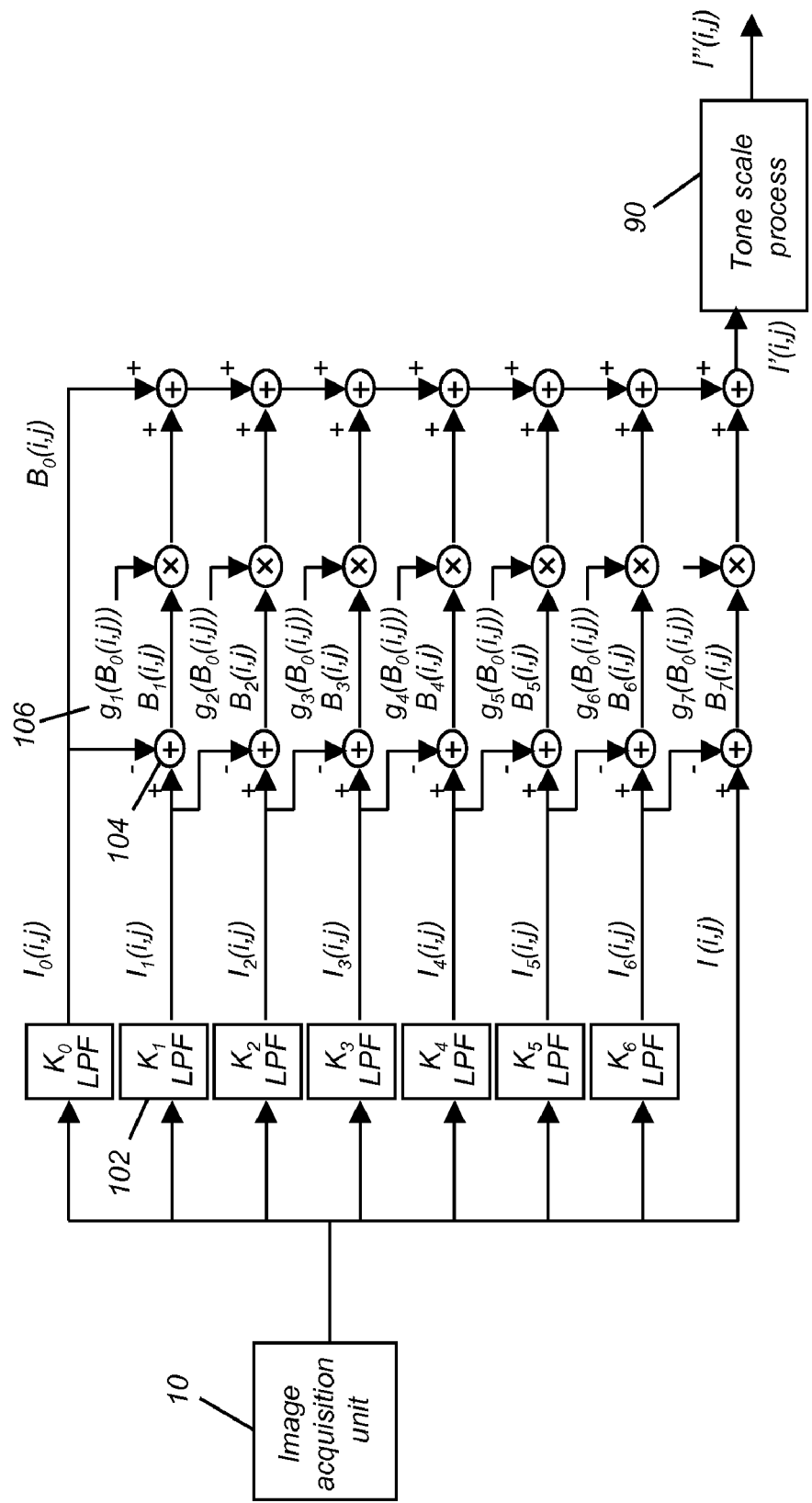
FIG. 12 is a schematic block diagram of enhancement processing in another embodiment of the present invention using a large number of frequency bands.

Referring to FIG. 12, there is shown a processing sequence that decomposes the input image to provide 8 manipulable frequency bands. Using the basic pattern shown in the example embodiment of FIG. 1, the various frequency bands are obtained using low-pass filters 102, and can use the results of preceding filtering to isolate the appropriate frequencies at a subtractor 104. Gain functions 106 can then be applied to form modified image data according to each band portion. The summed modified image data for each of the frequency bands form a reconstructed digital image I'(i, j) which can then be input to tone scale process 90 to generate output image I"(i, j). It will be evident to those skilled in the diagnostic imaging arts that other methods can be used to perform the frequency decomposition process, such as multi-scale Laplacian Pyramid decomposition (Burt and Adelson pyramid transformation).

Given the capability for manipulating more than a few frequency bands or channels, however, a new problem arises. Whereas it might be practical to provide a separate operator control for the gain of each of four frequency bands (N=4) using the example processing sequence of FIGS. 1 and 10, the same approach would prove cumbersome for the 8-channel processing (N=8) shown in FIG. 12. That is, providing a separate gain control for controlling the gain function $g_n(B_0(i,j))$ within each frequency band may not be desirable when frequency decomposition provides separate gain control capability for more than a few bands.

Figure 13:
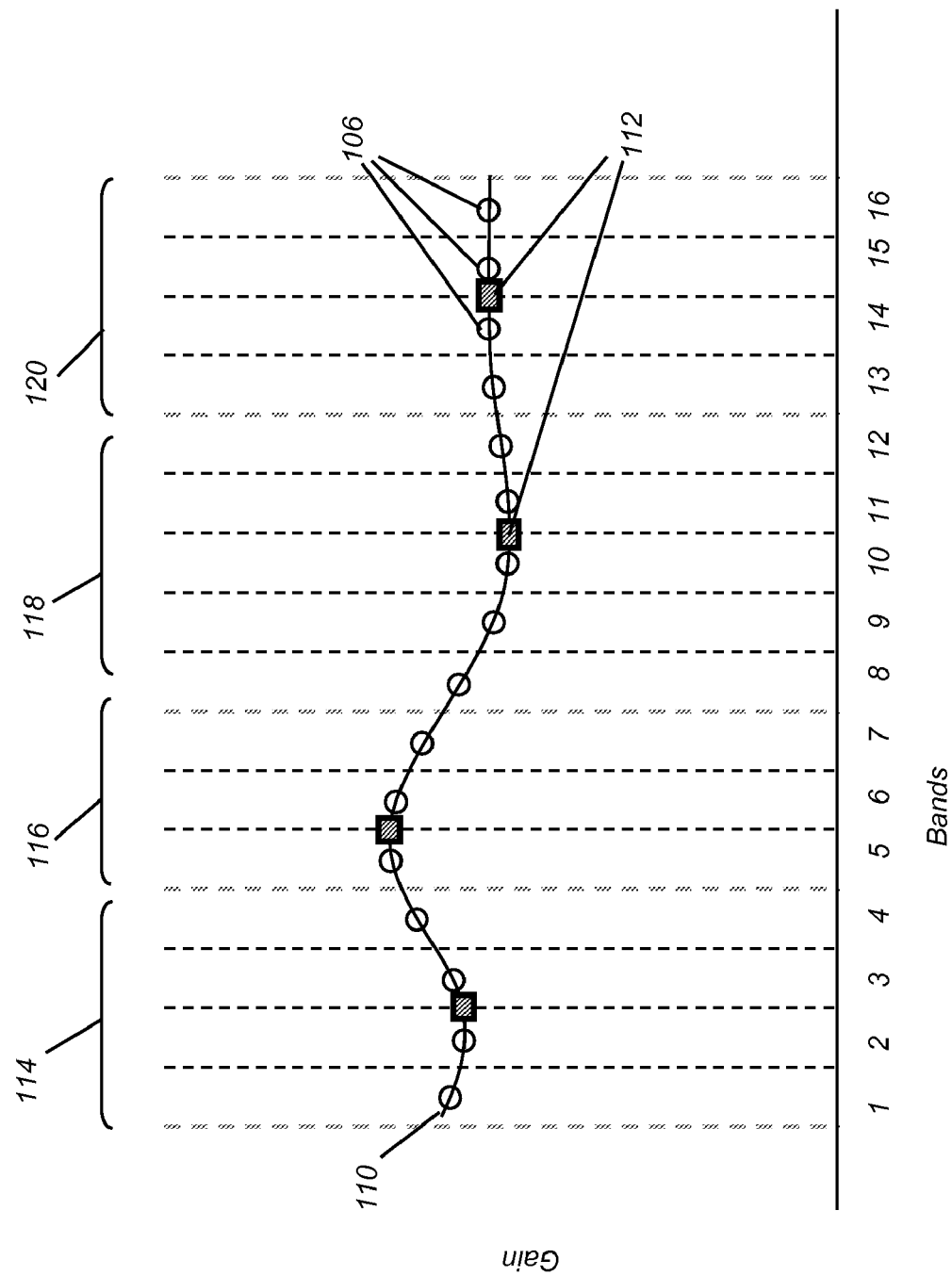
FIG. 13 is a graph showing control points for regions that contain multiple frequency bands, grouped by relative function.

The graph of FIG. 13 shows a gain curve 110 for an embodiment with 16 separate frequency bands (N=16), each having its own gain function 106. Instead of providing direct control of each gain function 106, the method of the present invention allows control of a smaller number (M) of control points 112. Control points 112 can be used as inflection points for curve 110, as shown in the example of FIG. 13. Here, each control point 112 corresponds to a frequency region 114, 116, 118, and 120. Frequency region 114 includes bands 1-4; frequency region 116 includes bands 5-7; frequency region 118 includes bands 8-12; and frequency region 120 includes bands 13-16.

Figure 16:
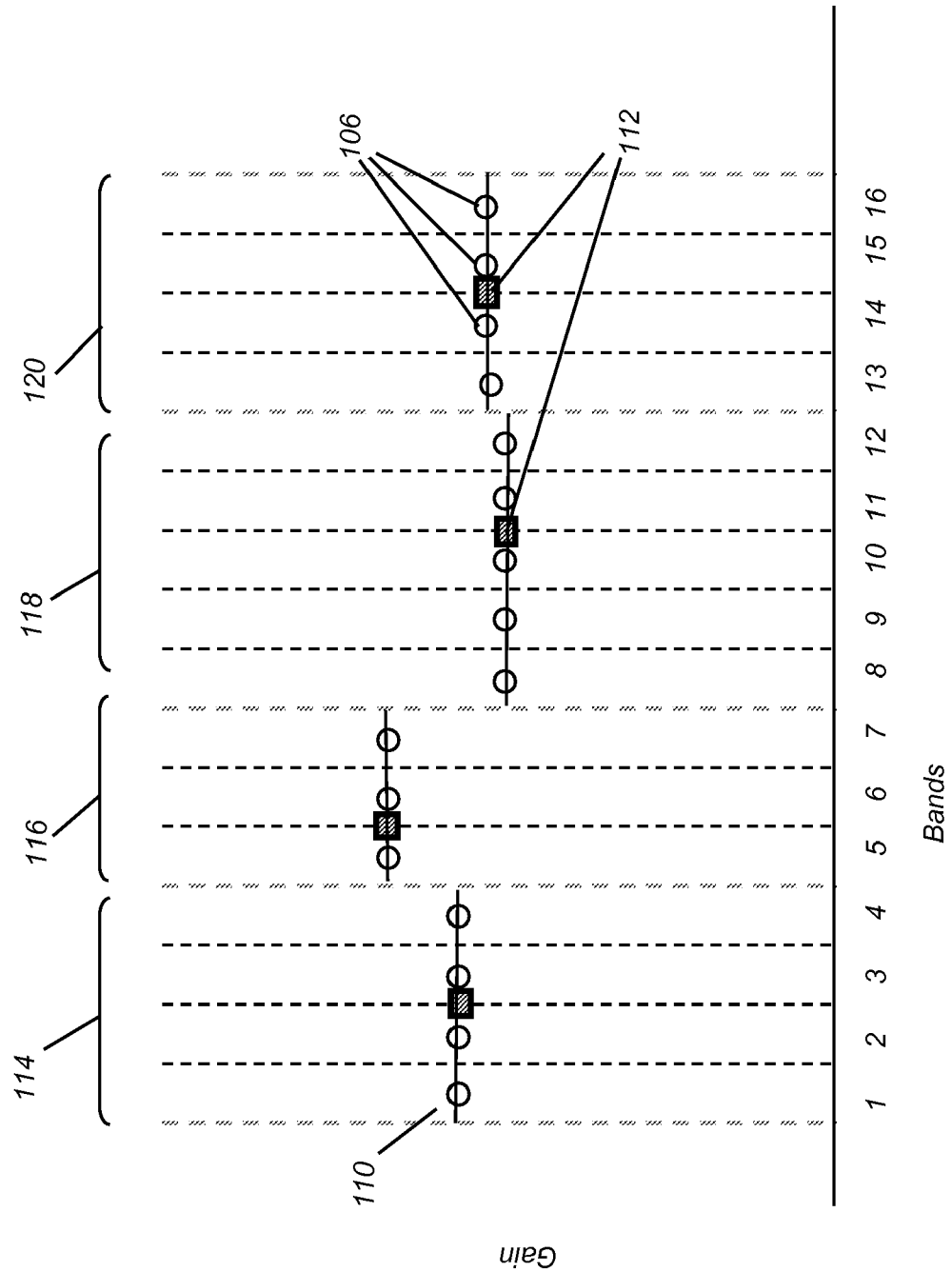
FIG. 16 is a graph showing control points for regions having multiple frequency bands, controlling all bands within the region without maintaining a continuous curve.

The setting of each control point 112 has most pronounced affect on frequency bands within its corresponding region. Referring to the example of FIG. 14A, control point 112 in frequency region 118 is adjusted to provide additional gain for frequency bands within that region. Bands 8-12 show the most change based on repositioning of control point 112 from its original position, shown in phantom. With this particular arrangement, a smooth transition between bands and between regions is provided, so that bands 6, 7, 13, and 14 in bordering regions are also adjusted to make curve 110 continuous and without sharp transitions. Techniques for providing a smooth transition can use bilinear interpolation, cubic spline, or other curve-fitting techniques. Alternately, as shown in the "step function" example of FIG. 16, control points 112 can be used to control each of the various frequency regions 114, 116, 118, and 120, so that gain for each frequency band within the respective region is set for the same scalar multiple value and more abrupt transitions between regions can occur.

Figure 14A:
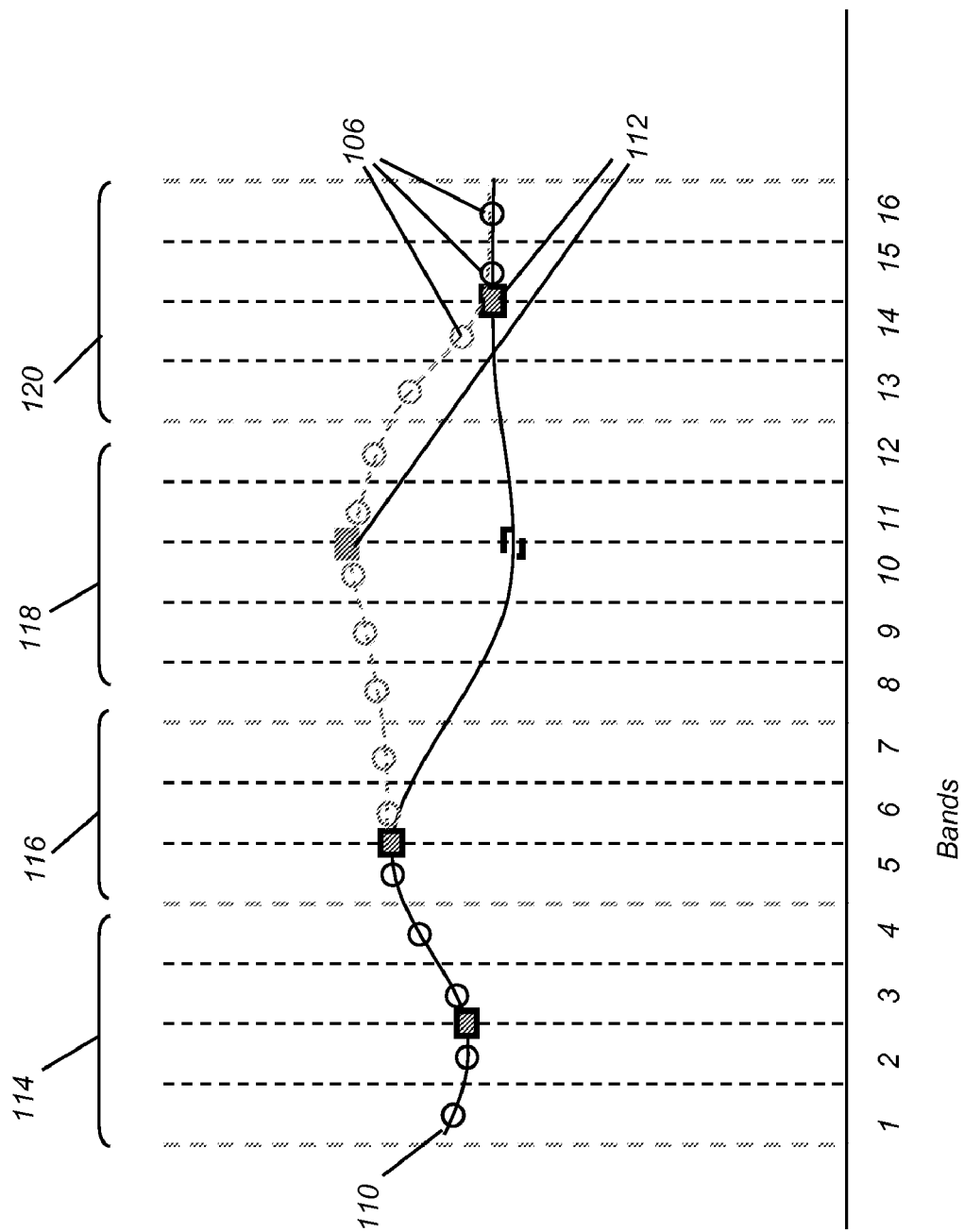
FIGS. 14A and 14B are graphs showing how the control points can be modified to adjust gain across multiple image frequency bands.
Figure 14B:
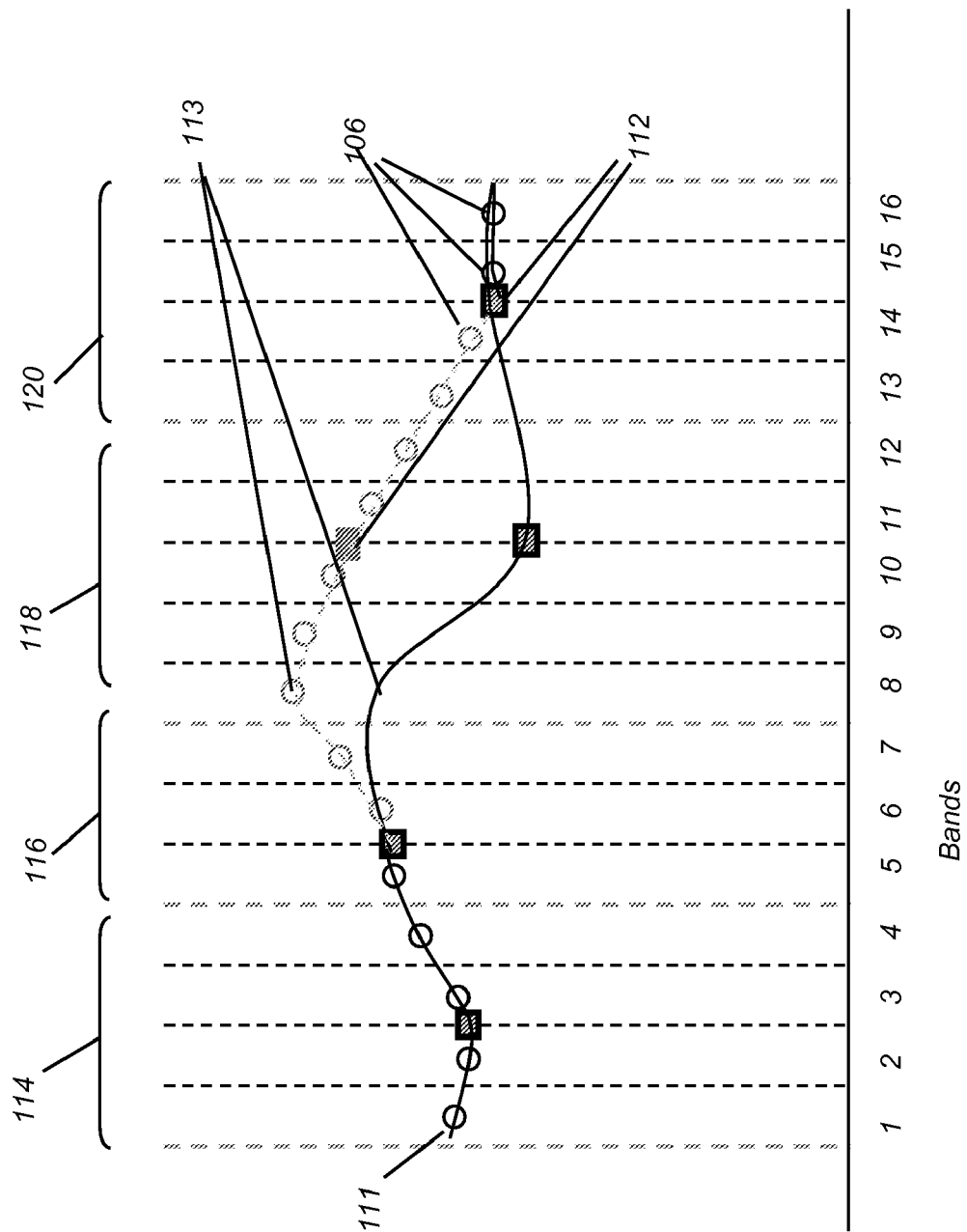

A gain curve 111 shown in FIG. 14B has an inflection point 113 at band 8. Inflection point 113 provides additional shaping leverage between the control points. The value of inflection point 113 could be a constant. Alternately, this value could be dependent upon the value of the gain at one or both of the control points, or upon some other function. There could also be more than one inflection point.

Given the multi-band processing shown in example embodiments of FIGS. 1, 10, and 12 and the graphs of FIGS. 13, 14A, 14B, and 16, it can be seen that the method and apparatus of the present invention are directed to the problem of controlling a number N of bands with a number M of controls, where N and M are both integers and the relationship M<N holds. In the example of FIGS. 13, 14A, 14B, and 16, there are sixteen bands, so that N=16. Four controls are used to manipulate the gain of these bands, so that M=4.

Figure 15:
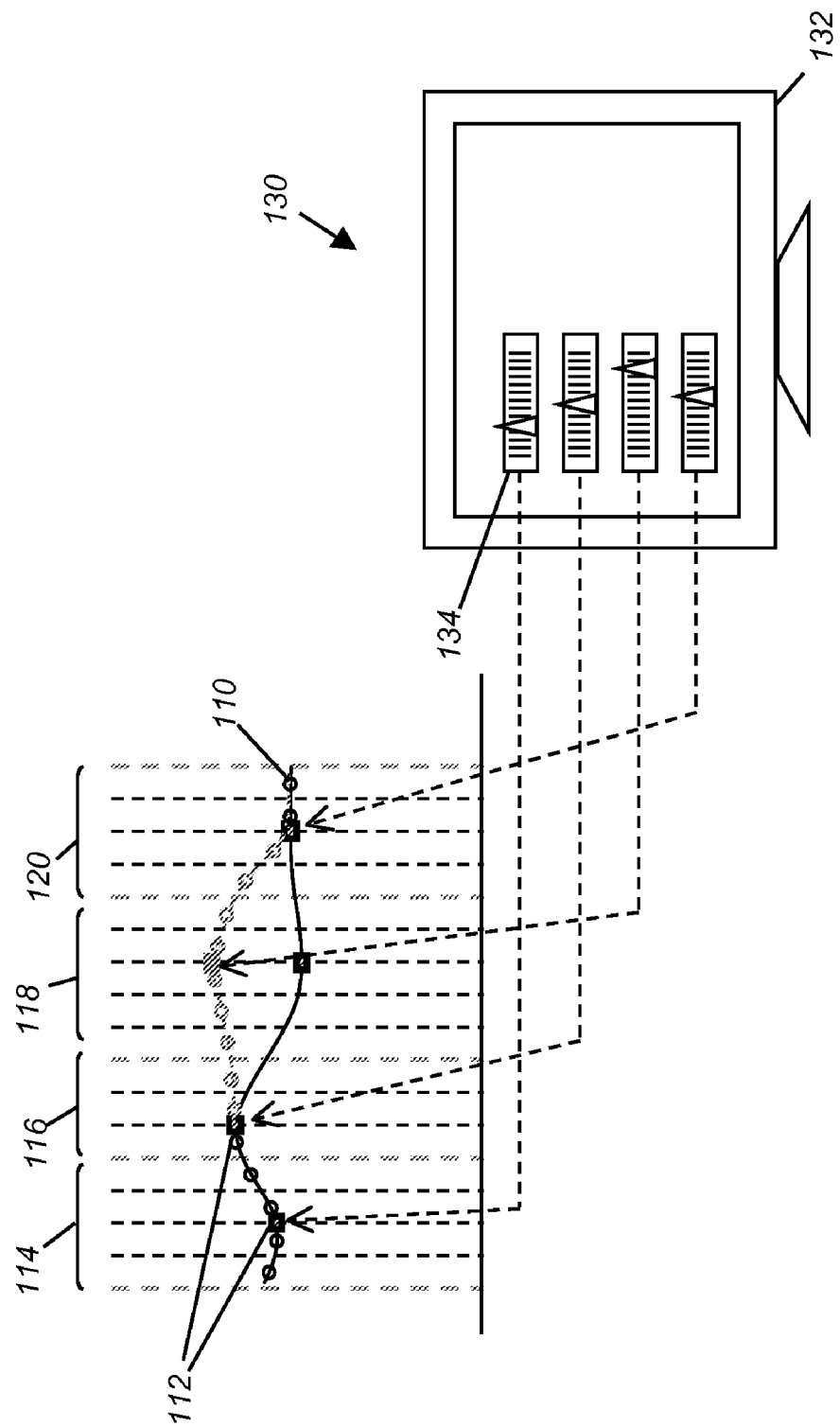
FIG. 15 is a diagram showing an operator interface that provides frequency band adjustment in one embodiment.

FIG. 15 shows one example of a user interface 130 that can be used for the example curves 110 or 111 of FIGS. 13, 14A, and 14B. Here, a display 132, such as a conventional workstation display monitor, for example, has a set of on-screen controls 134 for control points 112. Each control 134 has a single corresponding control point 112. In the example shown, a slider bar is shown as control 134. It can be appreciated that any number of other types of control could alternately be provided, both on-screen controls and manual controls, such as manual sliding switches or adjustable control knobs, for example.

The gain for each frequency band can be a simple scalar value or a multi-dimensional function. A multi-dimensional gain function g(x, y, z . . . ) can be dependent on a single factor or on any combination of factors such as image output density, input image exposure, the elements of the frequency band itself, a statistic of the frequency band (e.g. variance), and elements or statistics of other frequency bands, for example.

Figure 17A:
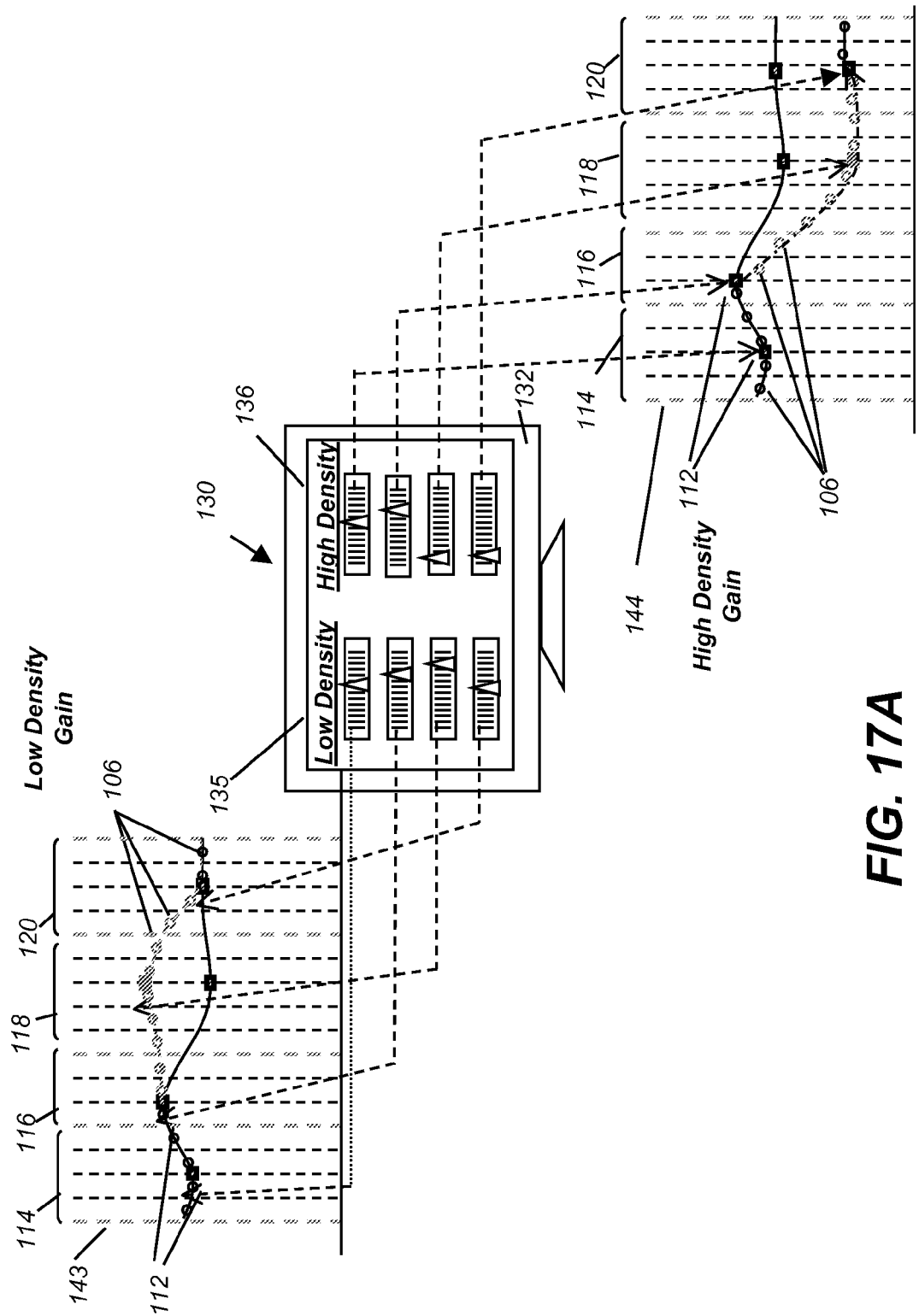
FIGS. 17A and 17B are graphs showing a gain function and operator interface that requires two operator inputs at each control point.
Figure 17B:
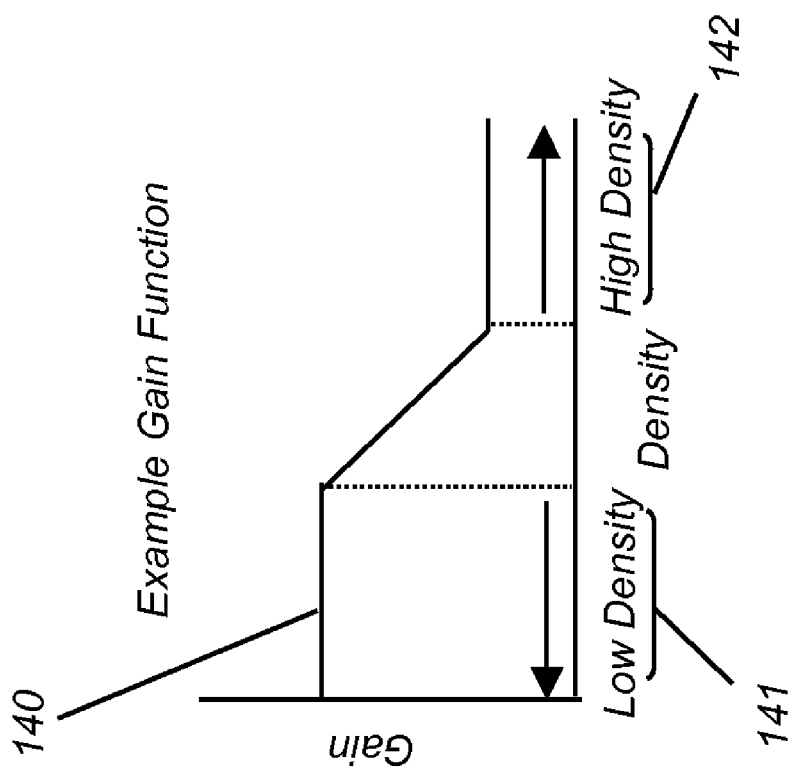

A particular gain function g(x, y, z . . . ) may require multiple parameters. This may require more than one user control to link into a single control point. To illustrate this point, FIG. 17A shows one example of a user interface that provides density-dependent control at four control points 112. In this example, a lower density (brighter) portion of the image data is distinguished from a higher density (darker) portion. A gain function 140 for each frequency band requires that a gain value be specified for both a range of low-density values 141 and a range of high-density values 142 of an output image. The gain for midrange density values (between low and high ranges) can be linearly mapped, as shown in the graph of FIG. 17B, or mapped using some other suitable relationship for transitioning between low-density and high-density values. For each control point 112, there is a low 135 and high 136 density gain control. Each frequency band has its own gain function that is derived from its own low density and high density gain values 106. FIG. 17A shows an example gain surface (the value of the gain function across all frequency bands) that is for all low-density values 143 and all high-density values 144. For the low density gain 143, bands 8-12 show the most change based on repositioning of control point 112 from its original position, shown in phantom. For the high density gain 144 bands 6-16 show the most change based on repositioning of control point 112 from its original position, shown in phantom.

It can be appreciated that each control point can have its own unique set of controls and each frequency band can have its own unique gain function g(x, y, z . . . ), or groups of frequency bands can have a commonly shared gain function g(x, y, z . . . ). It can also be appreciated that the input controls for each control point may not directly control the actual gain value, but may, instead, control another parameter from which the gain is derived.

It can be appreciated that providing values for control points 112 can also be done automatically. Control point 112 settings can be stored and saved as profiles for future use, such as for all images of a certain type, for a certain patient size or condition, for a certain diagnostician, or for a specific imaging system, for example.

As shown in FIGS. 1, 10, and 12, the frequency band values are recombined by being summed, thereby forming a reconstructed digital image I'(i, j). This reconstructed image then goes through tone scale process 90 that maps reconstructed digital image to optical densities.

Figure 11:
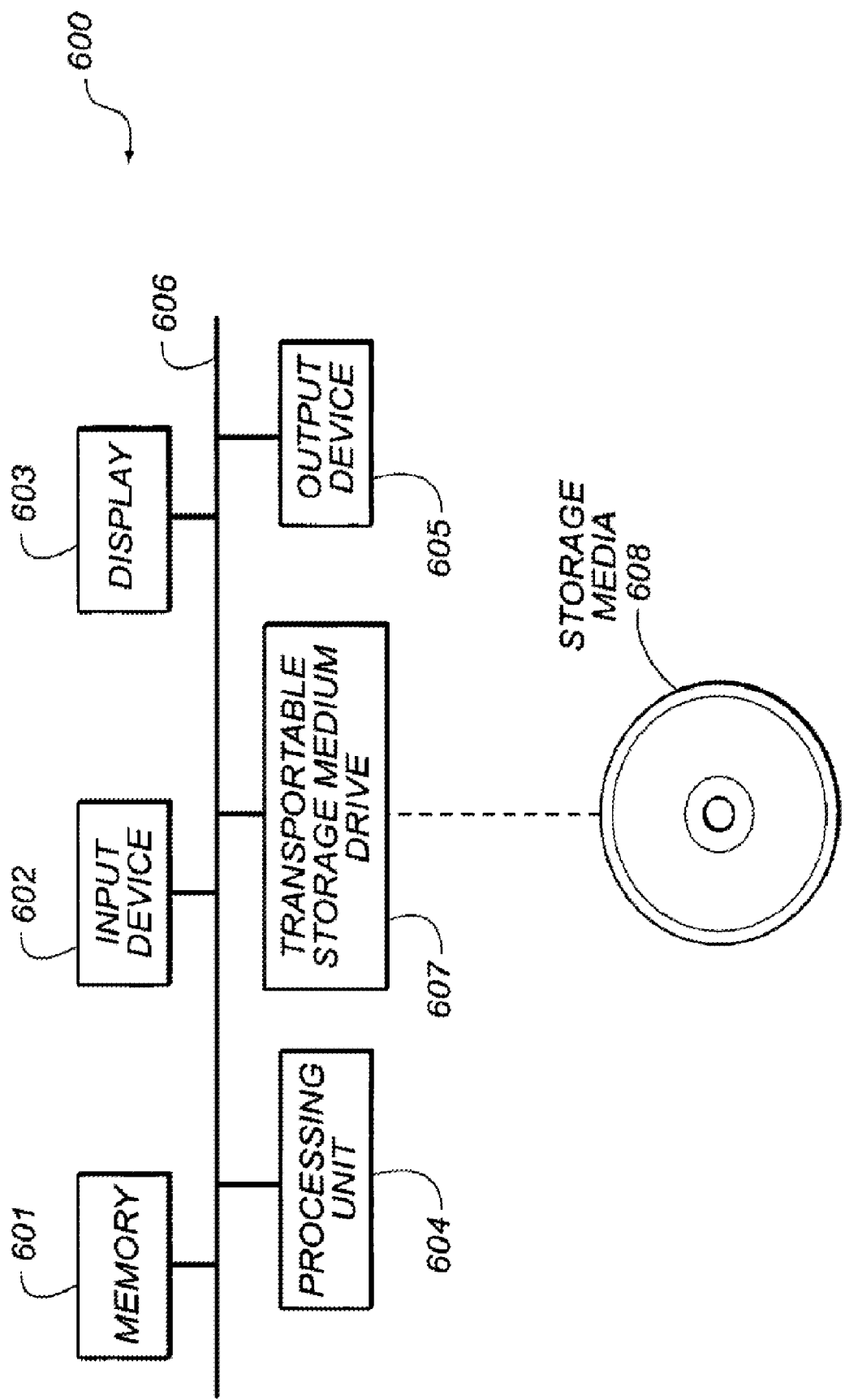
FIG. 11 is a block diagram of a digital image enhancement system for carrying out the present invention.

Referring now to FIG. 11, there is shown an exemplary digital computer 600 for carrying out the present invention in some embodiments. As shown, digital computer 600 includes memory 601 for storing digital images, application programs, operating systems, etc. Memory 601 can include mass memory (such as hard magnetic disc or CD ROM), and fast access memory (such as RAM). Computer 600 also includes input devices 602 (such as keyboard, mouse, touch screen) display 603 (CRT, Flat Panel Display), central processing unit 604, output device 605 (such as a thermal printer or laser printer, for example). Components 601, 602, 603, 604, and 605 are connected together by a control/data bus 606. Computer 600 can include a transportable storage medium drive 607 for reading from and/or writing to transportable storage media 608, such as DVD or CD.

The invention has been described in detail with particular reference to certain preferred embodiments thereof, but it will be understood that variations and modifications can be effected within the spirit and scope of the invention.

PARTS LIST 10 image acquisition unit
20 low-pass operator using filter $K_0$
30 low-pass operator using filter $K_1$
40 low-pass operator using filter $K_2$
60, 70, 80 subtractor
61,71,81 multiplier
62,72,82 adder
90 tone scale process
91,92,93 gain terms
100 example tone scale function
200 low detail contrast and wide latitude image example
201 high detail contrast and narrow latitude image example
300 high-density lung field area
301 low-density diaphragm area
400-403 multiplier
501-503 adder
600 computer
601 memory
602 input device
603 display
604 processing unit
605 output device
606 control/data bus
607 transportable storage medium
608 storage media
102. Low-pass filter
104. Subtractor
106. Gain function
110, 111. Gain curve
112. Control point
113. Inflection point
114, 116, 118, 120. Frequency region
130. User interface
132. Display
134, 135. Control
136. Control
140. Gain function 141. Low-density value
142. High-density value
143. Low-density value
144. High density value
I'(i, j). Reconstructed digital image
I"(i, j). Output image

The invention claimed is:

1. A method of enhancing a digital image comprising:
   obtaining the digital image;
   decomposing the provided digital image according to a plurality of a number N frequency bands, including a low frequency band and several different higher frequency bands;
   grouping said low frequency band and said several different higher frequency bands into regions, each such region having two or more adjacent frequency bands;
   forming modified image data by applying a gain function to image data for each region of the N frequency bands according to a setting of a number M control points one control point for each region, wherein M is less than N; and
   summing the modified image data for the N frequency bands to form a reconstructed digital image.

2. The method of claim 1 further comprising mapping the reconstructed digital image through a tone-scale look-up table to map the reconstructed digital image to optical densities.

3. The method of claim 1 further comprising providing a user interface utility with controls for obtaining gain adjustment values for one or more of the M control points.

4. The method of claim 3 wherein the controls are slider controls displayed on a display monitor.

5. The method of claim 3 wherein the controls are control knobs.

6. The method of claim 1 wherein applying a gain function further comprises the step of grouping subsets of adjacent bands of the N frequency bands into regions, wherein at least one region comprises multiple frequency bands.

7. The method of claim 1 wherein the gain function provides a scalar multiplier.

8. The method of claim 1 further comprising adjusting gain values for bands between control points using bilinear interpolation.

9. The method of claim 1 further comprising adjusting gain values for bands between control points using a cubic spline technique.

10. The method of claim 1 further comprising adjusting gain values for bands between control points using a curve-fitting technique.

11. The method of claim 1 wherein decomposing the provided digital image distinguishes a low density portion of the image content from a higher density portion of the image content and wherein one or more control points differ between lower density and higher density portions.

12. The method of claim 1 wherein digital image is a radiographic image.

13. The method of claim 1 wherein the gain function is a multi-dimensional function.

14. A method of enhancing a digital image comprising:
    obtaining a digital radiographic image;
    decomposing the provided digital radiographic image according to a plurality of a number N frequency bands, including a low frequency band and several different higher frequency bands;
    grouping said low frequency band and said several different higher frequency bands into regions, each such region having two or more adjacent frequency bands;
    forming modified image data by applying a user-controlled gain function to image data for each region of the N frequency bands according to a setting of a number M control points one control point for each region, wherein M is less than N;
    combining the modified image data for the N frequency bands to form a reconstructed digital image; and
    mapping the reconstructed digital image through a tone-scale look-up table to map the reconstructed digital image to optical densities.

15. The method of claim 14 wherein the user-controlled gain function provides a scalar multiplier.

16. The method of claim 14 further comprising displaying the mapped reconstructed digital image.

* * * * *